June 6, 1967  F. R. HAYS  3,323,886
RADIATION ABSORPTION HEATING OF A BUNDLE OF GLASS FIBERS
Filed May 1, 1963  4 Sheets-Sheet 1
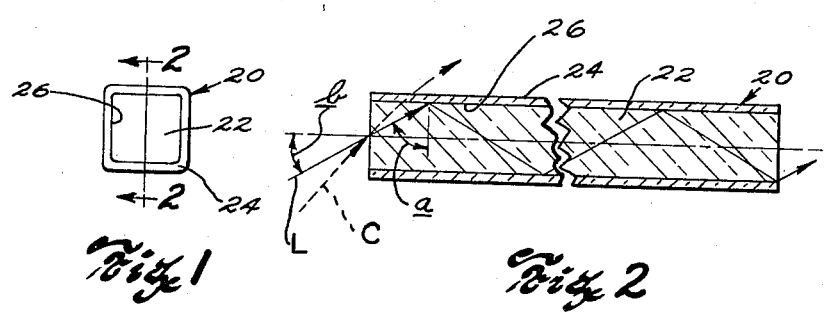
Fig. 1  Fig. 2
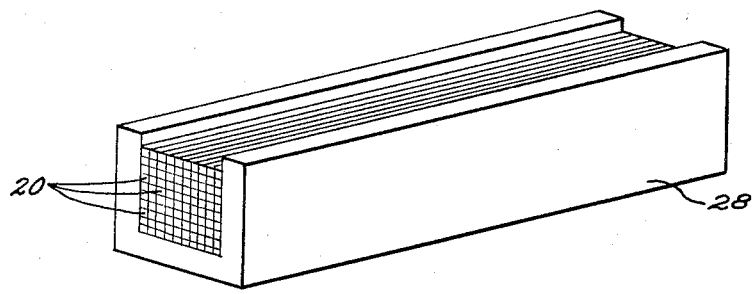
Fig. 3
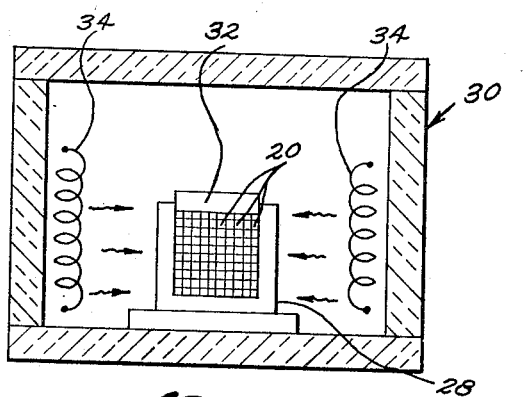
Fig. 4
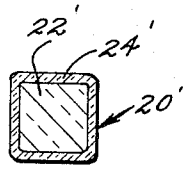  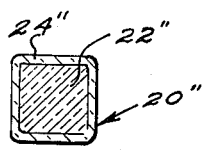
Fig. 5  Fig. 6
INVENTOR
FREDERICK R. HAYS
BY
ATTORNEY

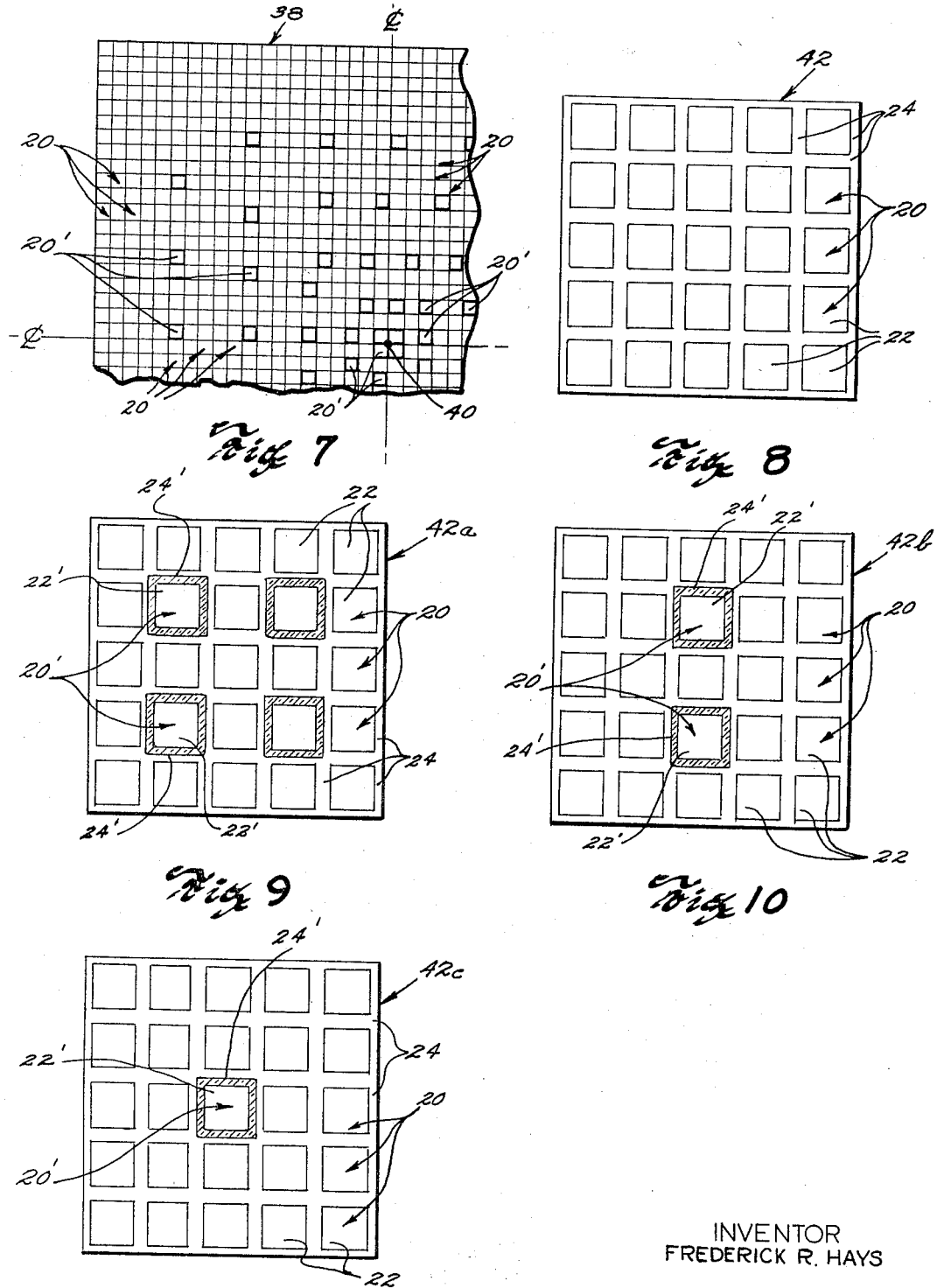

June 6, 1967 F. R. HAYS 3,323,886
RADIATION ABSORPTION HEATING OF A BUNDLE OF GLASS FIBERS
Filed May 1, 1963 4 Sheets-Sheet 3
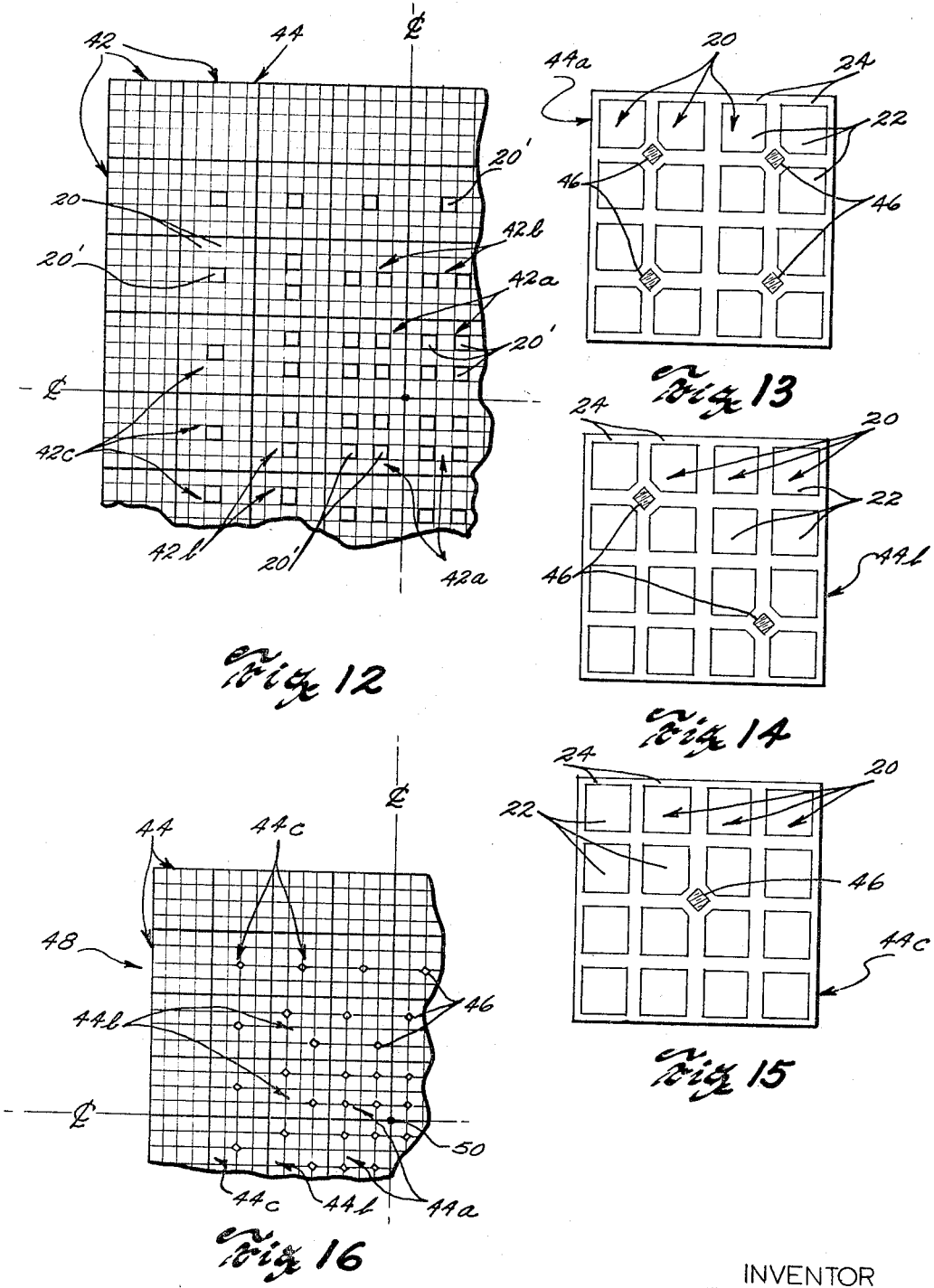
INVENTOR
FREDERICK R. HAYS
BY
ATTORNEY June 6, 1967 F. R. HAYS 3,323,886
RADIATION ABSORPTION HEATING OF A BUNDLE OF GLASS FIBERS
Filed May 1, 1963 4 Sheets-Sheet 4
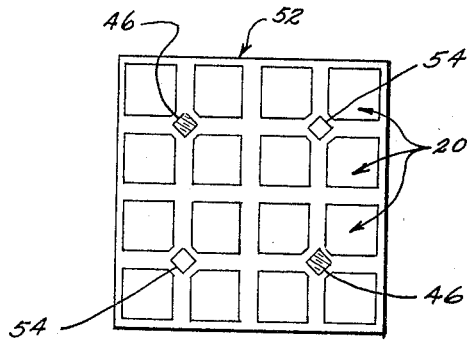
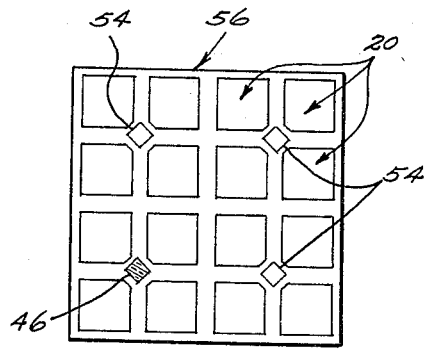
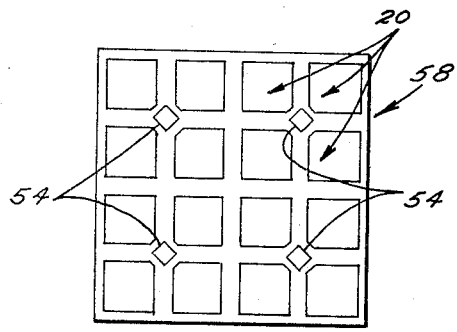
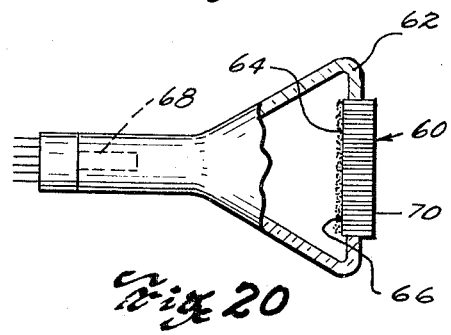
INVENTOR
FREDERICK R. HAYS
BY
ATTORNEY

United States Patent Office 3,323,886
Patented June 6, 1967

3,323,886
RADIATION ABSORPTION HEATING OF A BUNDLE OF GLASS FIBERS
Frederick R. Hays, Woodstock, Conn., assignor to American Optical Company, Southbridge, Mass., a voluntary association of Massachusetts
Filed May 1, 1963, Ser. No. 277,319
5 Claims. (Cl. 65—4)

This invention relates to fiber optical devices and has particular reference to improvements in fused fiber optical image transfer devices and a method for manufacturing the same.

Fused fiber optical image transfer devices are formed of a multiplicity of optical fibers each having a core of heat softenable light-transmitting material of a relatively high index of refraction surrounded by a cladding of heat softenable light-transmitting material of relatively low index of refraction. The fibers are secured together in bundled side-by-side relation, by fusing the fiber claddings together, so that corresponding opposite ends of the fibers cooperate to define mosaic image receiving and image emitting opposite end faces.

In fusing such bundles of fibers, particularly those of large diameter and formed of relatively long fibers, a heat distribution problem exists which, heretofore, has resulted in a tendency to overfuse or distort the outermost fibers of a bundle while the more centrally located fibers are underfused and often not completely or hermetically joined together. This is the result of the heat or furnace radiation having to be introduced radially through the sides of the bundle of fibers wherein radiation used for effecting fusion is gradually absorbed and reduced in intensity as it penetrates into the bundle. At any radial depth in a bundle of fibers, the heat generated is proportional to the absorption coefficient of the fibers in the bundle times the intensity of radiation at that depth. Since all of the fibers of conventional structures are formed of the same materials or of the same combinations of materials, the absorption coefficient of all depths in a bundle thereof is substantially the same. Consequently, absorption of furnace radiation as it penetrates the bundle results in uneven heat distribution in the bundle with less heat being generated internally thereof and the tendency for the innermost fibers of the bundle to be underfused while outermost fibers thereof are overfused.

It is an object of this invention to provide improved fiber optical devices of the fused type; to provide such devices which are uniformly fused throughout all depths thereof and to provide a simple, efficient and economical method of making such devices of consistently high quality.

A further object is to provide for hermetically sealing a relatively large bundle of many heat softenable fiber elements by fusion of said elements to each other substantially uniformly throughout all cross-sections of said bundle and without causing appreciable distortion of said fiber elements.

It is also an object of this invention to provide a novel and improved method of manufacturing a fiber optical device consisting of a bundle of fibers wherein secure fusion of respective fibers therein can be accomplished in less time, with temperatures lower than are usually required and with an assurance of security and uniformity of fusion throughout all depths of the bundle.

To attain the foregoing objects and others which may appear from the following detailed description, the present invention contemplates the provision of fiber optical structures which, when subjected to fusing temperatures in furnaces or the like, will absorb furnace radiation substantially equally at all depths therein so as to become substantially uniformly heated throughout all cross sections thereof.

In general, this is accomplished by providing fiber optical structures whose absorption coefficient progressively increases as the depth of the structure increases from the outermost fibers thereof to the centermost fibers thereby to balance the heat absorbed at all depths.

In accordance with principles of the invention, components having relatively high infrared absorbing properties are placed in the fiber optical structures in progressively increasing numbers and progressively closer spaced relation to each other as the center or axis of the particular structure is approached. The infrared absorbing components reradiate to neighboring fibers when the fiber optical structure is subjected to furnace radiation for fusing and thereby tend to equalize temperature distribution in the structure.

In one embodiment of the invention, the claddings of selected inner fibers of a bundle thereof to be fused can have a higher absorption coefficient for the infrared so as to reradiate to neighboring fibers. In another embodiment, the core parts of certain selected fibers in a bundle thereof can have the higher coefficient for the infrared or alternatively, relatively high infrared absorbing filaments can be placed between certain of the inwardly disposed clad fibers of a bundle to be fused. Combinations of the above approaches can also be employed.

The present invention will be more fully understood by reference to the following detailed description which is accompanied by a drawing in which:

FIG. 1 is a greatly enlarged end view of an individual optical fiber, of a fiber optical device constructed according to principles of the present invention;

FIG. 2 is a cross-sectional view taken on line 2—2 of FIG. 1;

FIG. 3 is a perspective illustration of a bundle of such fibers positioned in supporting means therefor;

FIG. 4 is a diagrammatic illustration of furnace means useful in effecting fusion of such a bundle of fibers;

FIGS. 5 and 6 are enlarged cross-sectional views of modified optical fibers useful in the fabrication of modifications of the present invention;

FIG. 7 is a fragmentary diagrammatic end view of an assembly of optical fibers of one embodiment of the invention;

FIGS. 8–11 are greatly enlarged diagrammatic end views of multifiber structures useful in the fabrication of devices of the invention;

FIG. 12 is a fragmentary diagrammatic end view of an assembly of multifiber structures of the type illustrated in FIGS. 8–11;

FIGS. 13, 14 and 15 are greatly enlarged end views of modified forms of multifiber structures which can be used in the fabrication of devices of the invention;

FIG. 16 is a fragmentary end view of an assembly of multifiber structures of the type illustrated in FIGS. 13–15;

FIGS. 17, 18 and 19 are enlarged end views of further modifications of multifiber structures; and FIG. 20 is a diagrammatic view illustrating use of a fiber optical device constructed according to the present invention.

Referring to the drawings, (FIGS. 1 and 2) fiber 20 comprises a core part 22 of light-transmitting material having a relatively high index of refraction and cladding 24 of light-transmitting material having a relatively low index of refraction. The fiber core and cladding parts form light-reflecting interface 26 therebetween. Fiber 20 is adapted to receive light at one end as indicated by light ray L which is incident upon interface 26 at angle $a$ greater than the critical angle of reflection for the interface. According to the well-known principle of total internal reflection, this light will be repeatedly reflected in the region of the interface 26 and thereby be conducted through the fiber from one end to its opposite end. When, for example, the fiber core part 22 is formed of flint glass having an index of refraction of 1.75 and the fiber cladding is formed of crown or soda lime glass or the like having an index of refraction of 1.52, light rays entering the fiber at an angle *b* as great as approximately 60° will be substantially totally internally reflected adjacent interface 26 and be conducted through core 22. The maximum light acceptance angle *b* is a function of the relative indices of refraction of the core and cladding materials as is well-known. The fibers may be square in cross-section as shown, or may be round, hexagonal or of other desired configurations within the scope of the invention. Heat softenable transparent materials other than glass may be used as long as the ratio of indices of refraction are such as to provide total internal reflection over a useful range of angles.

Fiber optical devices to which principles of the present invention are particularly applicable are, in general, formed by assembling a multiplicity of relatively long fibers such as 20 together in side-by-side relation and subjecting the resultant relatively long assembly thereof to heat sufficient to cause fusion of respective claddings 24 to each other.

For purposes of illustration, one of various techniques which can be used to fabricate such relatively long fiber optical assemblies is illustrated in FIGS. 3 and 4 wherein a multiplicity of fibers 20 are supported in a channel shaped block 28. Fibers 20 are stacked in parallel relation to each other in block 28. Block 28 is placed in a suitable oven or furnace 30. A weight 32 (see FIG. 4) or other compressing means is fitted within block 28 on top of fibers 20 to hold the same in intimate interfitting relation with each other and to provide a slight compressing force on said fibers during fusion thereof. Block 28 and weight 32 are preferably formed of suitable refractory materials which do not stick to the materials of fibers 20. Alternatively, a parting layer of material which does not stick to the glass or to the material of block 28 may be used. Mica may be used as such a parting layer. The assembly of fibers 20 is heated to fusing temperature by means such as electrical heating coils 34 or the like diagrammatically illustrated in FIG. 4.

Radiation from heating coils 34 penetrates block 28 and enters the assembly of fibers 20 to effect fusion of respective claddings thereof, and block 28 should be composed of a material which is relatively transparent to radiation from coils 34 or which efficiently conducts heat from the exterior to the interior.

Such an assembly of fibers may, alternatively, be supported for fusion within a tubular member of heat softenable glass material or the like rather than block 28 or held together with removable bindings or other suitable supporting means. Also, the assembly of fibers can be heated progressively from one end to the other thereof to effect fusion of its fibers.

In fusing relatively large diameter and long fiber optical assemblies wherein heat must be introduced radially through the sides thereof, there is the tendency for the outermost fibers to become overheated and consequently distorted while the innermost fibers are underheated and not completely jointed together. This is the result of furnace radiation being absorbed as it penetrates the assembly of fibers.

Since the heat generated at any depth in a bundle of fibers is proportional to the absorption coefficient times the intensity of radiation at that depth, a balance of heat absorbed at any depth can be achieved by increasing the absorption coefficient of the bundle of fibers as its depth increases.

In accordance with this invention, components having a higher absorption coefficient for infrared than that of ordinary optical fibers are interspersed within an assembly of such fibers which is to be fused so that the components are in increasing numbers and spaced progressively closer to each other as the center of the assembly is approached.

In one embodiment of the invention, a number of fibers 20' (see FIG. 5) are each provided with cladding 24' formed of relatively high infrared absorbing material. The index of refraction, expansion coefficient, viscosity and spectral (visible light) transmission characteristics of the material of claddings 24' is chosen to match or be substantially similar to that of cladding 24 of fibers 20. Accordingly, fibers 20' might, for example, embody core parts 22' formed of optical flint glass having an index of refraction of approximately 1.75 with claddings 24' thereon of soda lime glass having an index of refraction of approximately 1.52 and which has been rendered relatively highly absorbent to infrared radiation by the addition thereto of from .5 to 1 percent by weight of ferrous oxide.

In assembling fibers which are to be fused in accordance with the principles of the invention, the assembly may be formed of fibers 20 and 20' as diagrammatically illustrated in FIG. 7. Fibers 20', having relatively high infrared absorbing claddings thereon, as illustrated diagrammatically by heavy outline in FIG. 7, are placed in greater numbers adjacent center 40 of assembly 38 and in progressively lesser numbers with progessively wider spacings therebetween in radial directions away from center 40. Thus, in heating bundle 38 in the manner illustrated in FIG. 4, for example, furnace radiation will be absorbed in the usual manner by fibers 20 which have relatively low infrared absorbing properties. Infrared radiation from coils 34, however, will be more readily absorbed by claddings 24' of fibers 20'. Fibers 20' will reradiate to their neighbors and thereby tend to equalize the temperature distribution in bundle 38. This increased absorption compensates for the diminishing intensity of radiation toward the center of the assembly thereby providing for more uniform fusion throughout.

The number of fibers 20' interspersed within bundle 38 and the spacing provided therebetween is determined by the depth of bundle 38 so as to provide the bundle with a gradually increasing or higher absorption coefficient as the center of the bundle is aproached. In this way, temperature distribution throughout bundle 38 can be substantially equalized to produce uniform fusion throughout.

In another embodiment of the invention, fibers 20" of the type shown in FIG. 6 can be substituted for fibers 20' shown in FIGS. 5 and 7. Fibers 20" are formed with core parts 22" of relatively high infrared absorbing material and claddings 24" of material which is relatively nonabsorbent to infrared radiation. Fibers 20" can, for example, embody core parts 22" formed of flint glass containing from approximately .5 to 1 percent by weight of ferrous oxide and having an index of refraction of approximately 1.75. Claddings 24", in this instance, may be formed of conventional crown or soda lime glass or the like having an index of refraction of approximately 1.52. Ferrous oxide in core parts 22' will have substantially no effect upon white light transmitted through fibers 20".

It should be understood that, for purposes of clarity, fibers 20, 20' and 20" are illustrated in FIGS. 1, 2, 5, 6 and 7 as being rather large and only a relatively few fibers are bundled together to form assembly 38. Whereas in practice, the fibers may be only a few microns in transverse dimension and many thousands will be used.

Alternatively, where each light passage is required to be as small as 50 microns or less in diameter, fiber optical asssemblies can be made up of multifiber structures. That is, each fiber may contain a number of individual cores surrounded by low refractive index material and all fused together.

Such multifiber structures may be formed by grouping a selected number of relatively large fibers together in side-by-side relation and heating and drawing the group thereof to a reduced cross-sectional size at which time respective fibers of the group become fused to each other.

In FIG. 8, a greatly enlarged end view of such a multifiber structure 42 formed of a number of fibers 20 is illustrated. Multifiber structure 42 is shown, for ease of illustration, as embodying only a relatively few fibers 20 which are relatively large in cross-section; it being understood that within the scope of this invention, a greater number of fibers 20 per unit area might be provided in multifiber structure 42.

In a particular embodiment of this invention, multifiber structures are used in the fabrication of relatively long fused fiber optical devices similar to those illustrated in FIGS. 3, 4 and 7. In this type of construction, the multifiber structures are used as building blocks and are stacked, one upon the other, to form an assembly 44 such as shown in FIG. 12. Assembly 44 can be subjected to heat in the manner described with relation to assembly 38 so as to fuse respective multifiber structures together.

In accordance with the principles of the invention, assembly 44 is provided with relatively high infrared absorbing components interspersed therein in such manner as to increase the absorption coefficient of assembly 44 as its depth increases. This is accomplished by providing multifiber structures having different amounts of relatively high infrared absorbing components incorporated therein. Such multifiber structures are assembled with those having greater amounts of relatively high infrared absorbing components nearer the center of assembly 44 and those having lesser amounts of relatively high infrared absorbing components positioned progressively toward the outer boundaries of assembly 44.

In FIGS. 9, 10 and 11 multifiber structures 42a, 42b and 42c are illustrated as embodying relatively high infrared absorbing components. For purposes of illustration, multifiber structure 42a is shown to embody four such infrared absorbing components which, in accordance with one aspect of the invention, comprise fibers 20' having relatively high infrared absorbing claddings 24'. Claddings 24' of fibers 20' are cross-sectioned in FIGS. 9, 10 and 11 to distinguish the same from other parts of respective multifiber structures. Fibers 20, whose core and cladding parts are relatively nonabsorbent to infrared radiation make up the remainder of multifiber structure 42a. Multifiber structure 42b embodies two fibers 20' and multifiber structure 42c embodies a single fiber 20'; the remainder of structures 42b and 42c respectively being made up of fibers 20.

In assembly 44 (see FIG. 12), a plurality of multifiber structures 42a are positioned centrally therein, a layer of multifiber structures 42b surround structures 42a and a layer of multifiber structures 42c surround structures 42b. The outer boundaries of assembly 44 are made up of multifiber structures 20. In this construction, it can be seen that assembly 44 contains a number of relatively high infrared absorbing components (illustrated by heavy outline) which progressively increase in number and are in progressively closer spaced relation to each other as the center of assembly 44 is approached.

It should be understood that fibers 20" such as shown in FIG. 6 can be substituted for fibers 20' in the construction of multifiber structures 42a, 42b or 42c. Furthermore, more or less relatively high infrared absorbing components (fibers 20' or 20") can be incorporated in respective multifiber structures 42a, 42b or 42c.

In still another embodiment of this invention, infrared absorbing filaments having relatively high absorption coefficients for infrared can be inserted between respective fibers 20 of assemblies such as 38 (FIG. 7) or 44 (FIG. 12). In accordance with this aspect of the inventon, a number of multifiber structures similar to those illustrated in FIGS. 8–11 can be formed of fibers 20 having long and thin relatively high infrared absorbing filaments therein. In FIGS. 13, 14 and 15 enlarged end views respectively of three such multifiber structures 44a, 44b, and 44c have been shown. For purposes of illustration, multifiber structure 44a (FIG. 13) is shown as including four long and thin relatively high infrared absorbing filaments 46 while structure 44b (FIG. 14) includes two relatively high infrared absorbing filaments 46. Structure 44c (FIG. 15) includes a single relatively high infrared absorbing filament 46, it being understood that much greater numbers may be used to assure proper heat distribution in the fusing process.

Infrared absorbing filaments 46 can be formed of soda lime glass containing approximately 15% by weight of ferric oxide.

During the fabrication of respective multifiber structures 44a, 44b and 44c, filaments 46 are placed between respective fibers 20 which are initially grouped together, heated and drawn as described above with regard to fabricating multifiber structures.

In forming an assembly 48 of multifiber structures such as shown in FIGS. 13, 14 and 15 (see FIG. 16), a number of multifiber structures 44a are positioned centrally in assembly 48. A layer of multifiber structures 44b are placed around structures 44a and another layer of multifiber structures 44c are positioned to surround structures 44b. Surrounding multifiber structures 44c are multifiber structures 44 formed entirely of fibers 20 without relatively high infrared absorbing filaments therebetween. In this construction, it can be seen that assembly 48 contains a number of relatively high infrared absorbing filaments 46 which progressively increase in number and are in progressively closer spaced relation to each other as the center 50 of assembly 48 is approached. Thus, when assembly 48 is subjected to furnace radiation, as shown in FIG. 4, filaments 46 will readily absorb infrared radiation from heating coils 34 and reradiate to neighboring fibers 20 so as to equalize the temperature distribution in assembly 48.

In fused fiber optical devices of the type relating to this invention, light entering the core parts of fibers 20, 20' or 20" at one end thereof within their maximum light-acceptance angle $b$ (FIG. 2) will be conducted through said core parts, to their respective opposite ends. However, light entering said fibers at angles outside the maximum light-acceptance angle $b$ (see light ray $c$ in FIG. 1) will be transmitted through interface 26 and escape from the particular fiber. In fused fiber optical devices, this light enters adjacent fibers as stray light and produces what is termed as "cross-talk" between fibers. Such stray light can reach the output end face of the fused fiber optical device and produce an undesirable background of light which tends to wash-out or reduce contrast of light which is conducted through the core parts of the fibers.

Such undesirable stray light can be reduced by placing filaments which are absorptive to visible light between respective fibers of the device generally in the manner described hereinabove with relation to filaments 46. The stray light absorbing filaments, however, would preferably be interspersed throughout the device in substantially uniformly spaced relation with each other rather than in progressively increasing numbers toward the center of the device as described with relation to filaments 46.

In order to incorporate the use of stray light absorbing filaments along with the above described infrared absorbing filaments 46, the present invention contemplates the provision of multifiber structures such as are shown in FIGS. 17, 18 and 19. Multifiber structure 52 (FIG. 17) would embody two relatively high infrared absorbing filaments 46 and two light absorbing filaments 54 which are characterized to be relatively nonabsorbent to infrared radiation but relatively highly absorbent to visible light. Filaments 54 might be formed of soda lime glass containing approximately 20% manganese dioxide. Multifiber structure 56 (FIG. 18) would embody a single relatively high infrared absorbing filament 46 and three filaments 54. Multifiber structure 58 would embody four filaments 54 and no infrared absorbing filaments 46.

In making an assembly such as 48 (FIG. 16), in accordance with this aspect of the invention, a number of multifiber structures 52 would replace structures 44b in FIG. 16 and a number of multifiber structures 56 would replace structures 44c. Similarly, a number of multifiber structures 58 would replace structures 44.

In the resulting assembly, the combination of filaments 46 and 54 would be interspersed throughout the assembly and each would function to absorb visible stray light. At the same time, infrared absorbing filaments 46, being in progressively increasing numbers and closer spaced relation with each other in radial directions toward the center of the resultant assembly would function to absorb a substantial amount of infrared radiation and distribute heat uniformly throughout the assembly during fusion thereof in accordance with the principles of this invention.

It should be understood that the structures of FIGS. 17, 18 and 19, are purely illustrative. Various different combinations in numbers, position and spacing of filaments 46 and 54 might be provided in respective multifiber structures. Also, fibers 20' or 20" such as shown in FIGS. 5–11 can be provided with a second outer cladding having light absorbing properties similar to filaments 54 thereby to reduce undesirable stray light in structures such as shown in FIGS. 7, 12 and 16.

In all embodiments of the invention shown and described hereinabove, it can be seen that high energy infrared absorbing components are placed within fiber optical assemblies to be fused in such manner that these components are in progressively increasing numbers and progressively closer spaced relation to each other in radial directions toward a central axis through the particular assembly. Thus, when such an assembly is subjected to furnace radiation, these infrared absorbing components will absorb and reradiate heat to neighboring fibers to provide a relatively fast and even distribution of heat throughout all cross-sections of the assembly so as to effect uniform and secure fusion. With uniform temperatures being distributed throughout such fiber optical assemblies, lower than usual or minimum fusing temperatures can be used and less time than usual is required to effect complete and secure fusion of the assemblies. Lower temperatures and less exposure time to fusing temperatures reduce the tendency for distortion of fibers in an assembly thereof and obviate the wellknown adverse effects of overfusion or overexposure to furnace radiation.

Fused fiber optical devices of this type provided by this invention can be employed as faceplates for cathode ray tubes or the like, for example, as shown in FIG. 20. Cathode ray tubes, require face plate structures which are vacuum tight and which, together with the tube envelope, will hermetically seal the interior of the tube from outer atmospheres.

In providing a cathode ray tube with a fiber optical face plate, a relatively long fiber optical device such as is formed in accordance with this invention can be cut transaxially and parallel to an end face thereof to form a plate-like element 60 (see FIG. 20) of desired thickness. Element 60, being vacuum tight, is edge sealed in vacuum tight relation to the tube envelope 62 in conventional manner. Plate-like element 60 is provided with phosphors 64 upon the image-receiving, input end face 66 thereof.

Electron gun 68 of the cathode ray tube can then direct an electron beam as controlled by conventional tube deflecting means (not shown) for exciting phosphors 64 to form a light image upon face 66 in conventional manner. The core parts of fibers embodied in plate-like element 60 then receive light from respective segments of this light image and conduct a large part of said light through the cores for reproducing the light image in mosaic form upon face 70 of plate-like element 60 exteriorly of the cathode ray tube. In the embodiment of the invention wherein visible light-absorbing filaments 54 are incorporated, these filaments will absorb a substantial part of any stray light from the original light image which is not conducted through specific fiber cores.

This invention is not limited to the use of any particular glasses or combination of glasses in the construction of fused fiber optical devices such as described. Although particular embodiment of the image-transfer devices and methods of making the same according to this invention have been described herein for the purpose of illustration, it must be understood that this invention includes all modifications and equivalents thereof which fall within the scope of the appended claims.

I claim:

1. The method of forming a fused bundle of glass fibers wherein the improvement comprises the steps of arranging in compact side-by-side relationship with each other as a bundle a number of first glass fibers having one coefficient of absorption for radiated heat energy and a number of second fibers at least a portion of each of which has a substantially higher coefficient of absorption for said radiated heat energy whereby said portions of said second fibers will absorb greater amounts of radiated heat energy applied externally to said bundle than will said first fibers and at least some of said greater amounts of heat energy will become reradiated to respectively adjacent first fibers, during said step of arranging said first and second fibers placing said second fibers among said first fibers in progressively increasing quantities and mutual proximity relative to the distance from the outer sides of said bundle towards its center such that radiated heat energy absorbed by said second fibers and reradiated therefrom supplements heat produced in said first fibers to produce substantially uniform heating throughout said bundle and, after such arranging is completed, applying to the exterior of said bundle radiant heat energy of sufficient intensity to uniformly fuse all said fibers together.

2. The method as recited in claim 1 wherein said number of second fibers are each formed entirely of a material having a substantially higher coefficient of absorption for radiated heat energy than said first glass fibers.

3. The method as recited in claim 1 wherein said second fibers each has a core and a relatively thin cladding of glass, said claddings respectively being said portions thereof having said higher coefficient of absorption for radiated heat energy.

4. The method as recited in claim 1 wherein each of said second fibers has a core and a relatively thin cladding of glass, said cores being the portions thereof having said higher coefficient of absorption for radiated heat energy.

5. The method as recited in claim 1 wherein each of said second fibers is of multifiber construction at least a portion of which has said higher coefficient of absorption for radiated heat energy.

References Cited

UNITED STATES PATENTS 2,440,187   4/1948   Silverberg.

OTHER REFERENCES

General Electric Review: vol. 44 No. 3. March 1941 pp. 169–176 entitled "Infrared Production and Transmission Reflection and Measurement," by L. R. Koller.

DONALL H. SYLVESTER, *Primary Examiner.*

F. W. MIGA, *Assistant Examiner.*